Patented Dec. 22, 1925.

1,566,534

UNITED STATES PATENT OFFICE.

ERNST HAAGN, OF HANAU-ON-THE-MAIN, GERMANY, ASSIGNOR TO THE CORPORATION OF W. C. HERAEUS, GESELLSCHAFT MIT BESCHRÄNKTER HAFTUNG, OF HANAU-ON-THE-MAIN, GERMANY.

ALLOY AND ARTICLE PARTIALLY COMPOSED OF SAME AND PROCESS FOR PRODUCING THE ALLOY.

No Drawing.      Application filed August 21, 1924.  Serial No. 733,439.

*To all whom it may concern:*

Be it known that I, ERNST HAAGN, a citizen of the German Empire, residing at Hanau-on-the-Main, Germany, have invented certain new and useful Improvements in Alloys and Articles Partially Composed of Same and Processes for Producing the Alloys, of which the following is a specification.

Alloys are known—particularly for the purpose of tipping gold pen nibs—which contain at least 70% of osmium, in association with another metal of the platinum group, especially iridium, platinum, or palladium. Alloys for the same purpose have also been made, consisting of 50% of tungsten, 30% of cobalt or nickel and 20% of platinum.

It has now been found that the tungsten content can be considerably increased and that of the platinum correspondingly lowered, if, in place of the metals cobalt or nickel—which lower the melting point—a small addition (not exceeding 3%) of iridium be employed. In such event, the percentage of tungsten may be increased up to 90%.

The products are distinguished by great hardness and high breaking strength. The components can be melted together without any injurious secondary effects, if said components be powdered and then compressed into the form of a small cylinder and subjected to the action of an electric arc light the melting process being accomplished quickly and in presence of a current of reducing gas such as hydrogen. The melting can also be effected by means of cathode rays instead of an electric arc.

A suitable composition is 90% tungsten, 8% platinum and 2% iridium. The iridium content may vary between 1% and 3%, and the ratio of tungsten to platinum may also vary in a similar manner.

The alloy is easily soldered on other metals, and in addition to being used for the tips of gold pen nibs, is applicable to similar purposes, e. g. needles for talking machines, or compass pins, in which it is desired that the tip should consist of a material exhibiting great hardness and in some cases also considerable acid-resisting powers.

What I claim and desire to secure by Letters Patent is the following:

1. An alloy consisting of 80–90% of tungsten, 10–17% of platinum and 1–3% of iridium.

2. Pointed articles, the tips of which consist of an alloy, consisting of 80–90% of tungsten, 10–17% of platinum and 1–3% of iridium.

3. Process for the production of an alloy, consisting of 80–90% of tungsten, 10–17% of platinum and 1–3% of iridium, which process consists in that the specified proportions of the components are powdered, compressed into a small block and exposed to a luminous electric arc in a current of reducing gas.

4. Process for the production of an alloy containing tungsten and metals of the platinum group, which process consists in powdering the tungsten and the metals of the platinum group to be alloyed therewith, compressing the powdered ingredients into block form, and then exposing them to the action of an electric arc in a reducing atmosphere.

In testimony that I claim the foregoing as my invention, I have signed my name this 8th day of August 1924.

ERNST HAAGN.